United States Patent [19]

Pompier

[11] Patent Number: 4,837,553

[45] Date of Patent: Jun. 6, 1989

[54] DEVICE FOR TRANSMISSION OF AN ELECTRIC SIGNAL FROM A DEVICE FOR MONITORING A DRIVING WHEEL ON A VEHICLE

[75] Inventor: Jean-Pierre Pompier, Enval, France

[73] Assignee: Michelin & Cie, Clermont-Ferrand, France

[21] Appl. No.: 111,349

[22] Filed: Oct. 22, 1987

[30] Foreign Application Priority Data

Nov. 4, 1986 [FR] France ................. 86 15453

[51] Int. Cl.⁴ .................................... B60C 23/00
[52] U.S. Cl. ........................... 340/442; 340/58
[58] Field of Search .............. 340/58, 52 A; 73/146.5, 73/146.8

[56] References Cited

U.S. PATENT DOCUMENTS

| | | | |
|---|---|---|---|
| 2,063,452 | 12/1936 | McDonnell | 340/58 |
| 2,235,930 | 3/1941 | Huggins | 201/48 |
| 2,313,247 | 3/1943 | Krow | 340/58 |
| 3,162,835 | 12/1964 | Dudar | 340/58 |
| 3,757,294 | 9/1973 | Schultz | 340/58 |
| 4,489,599 | 12/1984 | Andrei-Lexandru et al. | 73/146.5 |
| 4,562,421 | 12/1985 | Duffy | 340/52 A |

FOREIGN PATENT DOCUMENTS 2502238 7/1976 Fed. Rep. of Germany .
2744777 4/1979 Fed. Rep. of Germany .

*Primary Examiner*—Joseph A. Orsino, Jr.
*Assistant Examiner*—A. H. Chau
*Attorney, Agent, or Firm*—Oblon, Fisher, Spivak, McClelland & Maier

[57] ABSTRACT

The transmission of an electric signal between a driving wheel and the vehicle exclusively by electric conduction requires the presence of two electrically conductive paths. One of the conductive paths includes suspended stationary elements and a bearing of the driving wheel. The end of the transmission is insulated from the ground and the part of the transmission not insulated from the ground is included in the other of the conductive paths.

13 Claims, 4 Drawing Sheets

DEVICE FOR TRANSMISSION OF AN ELECTRIC SIGNAL FROM A DEVICE FOR MONITORING A DRIVING WHEEL ON A VEHICLE

BACKGROUND OF THE INVENTION

1. Field of the Invention

This invention relates to the transmission of an electric signal by electric conduction between a driving wheel and a vehicle.

2. Brief Description of the Related Art

Monitoring the inflation pressure of tires poses a problem so far poorly solved; that of the transmission of information between a rotating element, namely the wheel, and the vehicle to which this wheel is connected. More precisely, the problem to be solved is that of transferring information from "the stationary portion of the vehicle" to the mobile elements in rotation relative to this stationary portion. The stationary portion particularly comprises the suspension arms and the wheel carrier which, although not entirely stationary, do not rotate.

Devices using electric conduction to transmit an electric signal require the presence of a rotating electric contact in at least one point in the electric circuit. To avoid resorting to a device with rings and brushes of the type used in electric motors, U.S. Pat. No. 2,235,930 proposes placing a rotating electric contact on the axis of rotation of the wheel, at the end of the hub.

U.S. Pat. No. 4,489,599 uses a bearing instead of a rotating electric contact to provide the transmission of an electric signal. However, the device there proposed is complex to fabricate, particularly because it requires making two mechanically complex electric connections, that is to say one connection per bearing race. Further, there must be at least two wheel bearings, in order for the second bearing to provide grounding to the vehicle in the standard way, as is the case for circuits that monitor the wear of brake linings. Recent developments in automobile mechanics have led to wheel supports providing only one bearing per wheel, i.e., a bearing using a single stationary race and a single rotating race. The trend to parts integration has even lead to designing bearings, one of whose races itself constitutes the hub or wheel carrier. These developments are not compatible with the solution proposed by U.S. Pat. No. 4,489,599.

SUMMARY OF THE INVENTION

The object of this invention is to provide a device for transmission of an electric signal which functions exclusively by electric conduction between the rotating elements and stationary portion of a vehicle, and which is extremely simple to install on the vehicle.

Another object of the invention is to provide such a device which imposes only a minimum of modifications in existing mechanical parts, providing simplification as compared to known devices.

According to the invention, the device for transmission of an electric signal by electric conduction from a rotatable driving wheel, to the stationary portion of a vehicle supporting said wheel is provided by two electrically conductive paths, one providing the electric connection between operating means placed on the vehicle and electrical means for monitoring or otherwise affecting the wheel, the other providing the grounding to the vehicle. The one conductive path comprises at least one bearing of the wheel and at least one unsuspended element located in the stationary portion, said element being in electric contact with the outside race of said bearing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
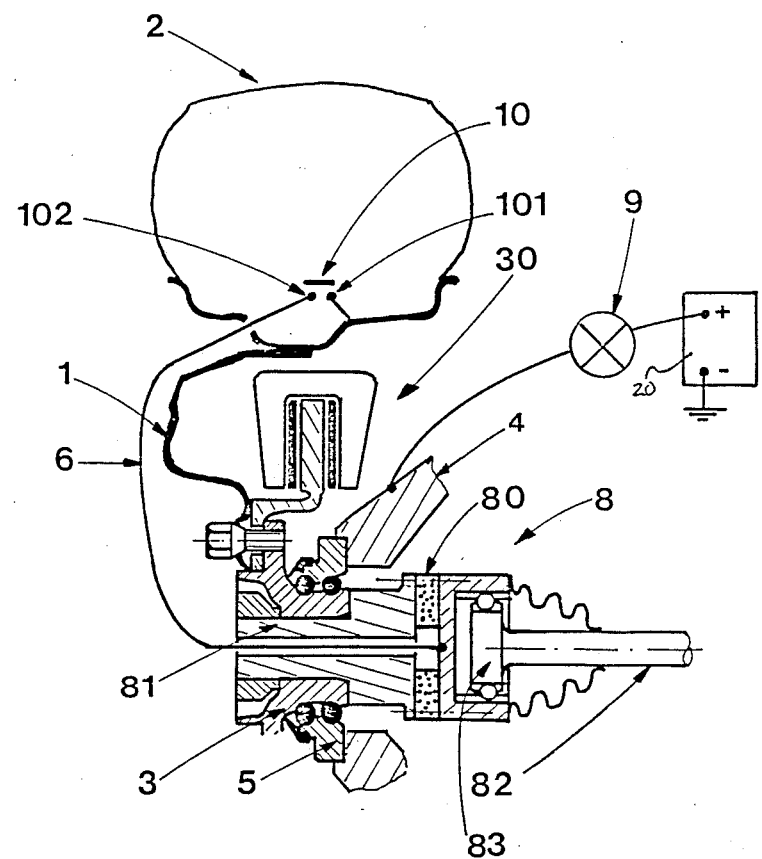
FIG. 1 is a general illustration of a first embodiment of the invention.

FIG. 1 shows a wheel 1 on which a tire 2 is mounted. The wheel is fastened to a hub 3. The hub is fastened to a wheel carrier 4 by means of bearing 5, hub 3 constituting the inside race of bearing 5. The means for monitoring the tire pressure is an electrical means in the form of a pressure sensitive switch 10 which opens an electric circuit (circuit off) when the pressure is sufficient and which closes said electric circuit (circuit on) when the pressure falls below a chosen threshold. The operating means placed on the vehicle can consist very simply of an electric light bulb 9 or a light-emitting diode. One of the poles 101 of pressure switch 10 is connected to the electric light bulb 9, via a conductive path described below, which is further connected to the positive pole of the battery 20. The other pole 102 of the pressure sensitive switch 10 must be grounded, via another conductive path, to close the circuit. Therefore, it is necessary to provide two electrically conductive paths.

One of the conductive paths includes the set of mobile elements in rotation, namely brake disk, wheel 1 and hub 3, as well as bearing 5 and the stationary portion including one or more suspension elements, for example wheel carrier 4. As a general rule, all these mechanical parts are electrically conductive. The suspension elements (suspension arms and springs) are typically connected to the frame by means of rubber bushings and therefore are electrically insulated therefrom. A conductive electric wire may already be provided for electric connection between certain mechanical parts and the frame to ground an already existing electric circuit for monitoring the wear of the brake linings.

FIG. 1 shows bearing 5 inside of which the end of mechanical engine torque transmission 8 passes. It is necessary to eliminate any grounding electric connection, for example that which may exist for the electric circuit monitoring the wear of the brake linings, with respect to these parts. Wheel carrier 4 is electrically connected to operating means shown in this example by the electric bulb 9 to achieve the one conductive electric path connecting monitoring bulb 9 to pressure switch 10 installed on wheel 1.

The bearings of the mechanical torque transmission 8 (except bearing 5 carrying the wheel) are used as rotating electric contacts to provide grounding. Mechanical engine torque transmission 8 includes an electrical insulation 80 between a part 81 which is conductive with respect to wheel carrier 4, and a part 82 which is at the electric ground potential of the vehicle. In this embodiment, the insulation 80 is installed outside of the last homokinetic joint 83. One of the poles 101 of pressure switch 10 is connected to one of the rotating parts, for example, to the wheel 1. The other pole 102 of pressure switch 10 is grounded by a conductive element consisting of an insulated conductive wire 6 going through a bore in part 81 of mechanical transmission 8 which is electrically insulated from the ground. The wire 6 goes through end part 81 approximately at its center and is connected to grounded part 82 of mechanical transmission 8 via joint 83 to form another conductive electrical path.

It is therefore found that existing bearings achieve all the necessary rotating electric contacts in a particularly advantageous manner. In this way, it is possible to provide a device for monitoring otherwise affecting a tire mounted on a driving wheel in which an electric signal is transmitted between the wheel and the stationary portion by electric conduction. Insulated conductive wire 6 is connected at its two ends to parts immobile in rotation relative to one another, namely, pressure switch 10 installed on wheel 1, on the one hand, and mechanical engine torque transmission 8, on the other hand. The other electric path uses existing mechanical parts.

A bore is provided through the center of part 81 at the very end of the mechanical engine torque transmission to come out axially at the center of the wheel. This modification in the transmission can be achieved without impairment of its mechanical performance because the portion of the part 81 located on the axis contributes only slightly to its resistance to mechanical torsional stresses.

It has been found that the degree of electric current transmission via the bearings is not always consistent over time: it depends on the type of bearings used and also on their heating. However, the electric conduction is always sufficient to transmit a threshold electric signal and it is very easy to prevent the blinking of electric bulb 9 resulting from transient interruption of the electric conduction, by amplification of the signal or any other suitable means. However, it has been found that the electric conduction can be improved by providing that the passage of the electric current is also provided by a third electrically conductive path comprising brakes 30 electrically connected in parallel with the conduction provided by wheel bearings 5. Actually, brake linings often lightly brush the brake disks even when the brakes are released. Thus, in the device illustrated in FIG. 2, the one electric path comprising an element located in the stationary portion, namely wheel carrier 4, further comprises braking elements 30, for which electrically conductive brake linings are chosen, the linings normally being in sliding electric contact with the brake disc. Since the linings are also in contact with the caliper, which is bolted to the stationary portion, a parallel conductive path is formed to the operating means.

Figure 2:
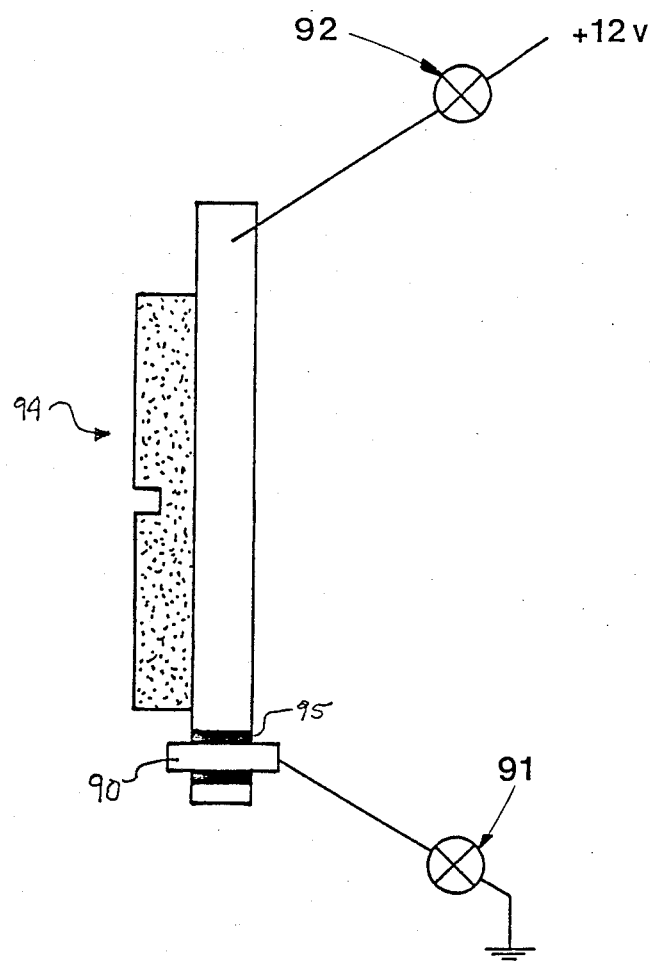
FIG. 2 is a schematic diagram of connection of a tire monitoring sensor and a brake monitoring sensor.

FIG. 2 diagrammatically shows the modifications to be provided to an existing electric circuit for monitoring the wear of the brake linings. When pressure switch 10, installed in wheel 1, is turned off, all the braking elements are at the potential of the positive terminal of the battery. If the same bulb is to be used for indicating either wearing of the brake linings or insufficient inflation of the tire without distinguishing between the two, it suffices to ground the inspection element 90 detecting the maximum braking wear level. It is instead possible, as shown in FIG. 2, to ground it via a second operating means comprising an electric bulb 91 which can be lit by a current markedly less than that necessary for bulb 92 connected to the positive terminal of the battery, thus forming a fourth electrically conductive path. Thus, in the case of maximum wear of the brake linings, only bulb 91 will light and in case of insufficient pressure, only the bulb 92 will light.

In operation, assuming that the tire pressure is satisfactory and the pressure switch 10 is turned off, the circuit from the positive terminal of the battery to ground is shorted, since the inspection element 90 is separated from the brake lining 94 by insulation 95. Therefore, neither of the bulbs 91 or 92 is lit. If the brake lining becomes worn beyond a certain point, the inspection element 90 makes contact with the brake disc. Assuming that the pressure switch 10 remains turned off, current flow from the positive terminal of the battery to the ground will be through a circuit including the region of sliding contact between the brake rotor and the inspection element 90. Since there will be a relatively large electrical resistance at this sliding contact, and/or because of the choice of the electrical resistance of the bulb 91, the current flow will be insufficient to light the bulb 92 but will be sufficient to light the bulb 91, thereby indicating excessive brake wear.

Although not shown in FIG. 2, the bulb 92 is also connected as is the bulb 9 of FIG. 1, and so is electrically connected to the pressure switch 10 independently of the brake lining 94. Assuming that the tire pressure drops below an acceptable level, an electric current path as shown in FIG. 1 is established between the positive terminal of the battery 20 and ground, independently of the inspection element 90, and bulb 92 will light while bulb 91 will not. It is thus very easy to design a more elaborate electric circuit, making it possible to selectively control the specific alarms for each phenomenon.

Figure 3:
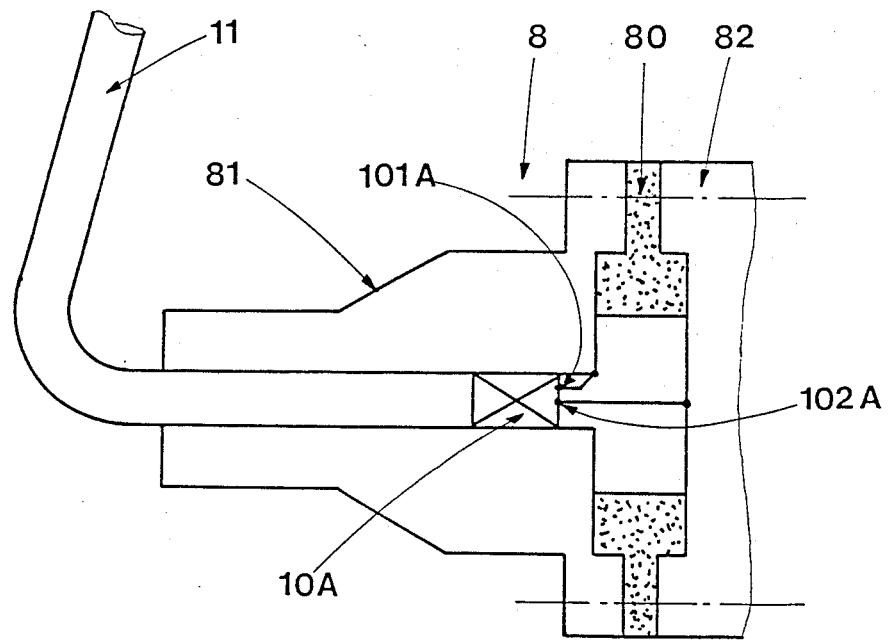
FIG. 3 shows a variant of the first embodiment of the invention.

FIG. 3 illustrates another variant of the device according to the invention, in which the tire monitoring means is also a pressure switch 10A. This pressure switch 10A is mounted inside the mechanical engine torque transmission 8. It is put in pneumatic contact with the pressure prevailing inside the tire by an air duct 11 and is in electric contact, by one of its poles 101A, with the part 81 of the transmission in electric contact with wheel carrier 4 and, by the other of its poles 102A, with the part 82 of the transmission in electric contact with the ground.

As a further variant, pressure switch 10A can be integrated into electrical insulation 80 provided between the elements of mechanical transmission 8. This variant involves a minimum of modifications in the mechanical parts; namely, a central boring is made in part 81 to connect the duct 11 and the electrical insulation 80.

The pressure switch 10A corresponds to that shown in FIG. 1. It is supplied with air pressure from the tire via the air duct 11. Its terminal 102A is grounded to the transmission shaft in a manner similar to that in FIG. 1. Its terminal 101A is electrically connected to the conductive part 8 which, as in FIG. 1, is an electrical conductive connection with the positive terminal of the battery.

It is noted that there are mechanical transmissions having a rubber joint in the kinematic chain. There are also transmission shafts made of electrically nonconductive material. These transmission are made satisfactory for use with a device according to this invention by use of a conductive grounding wire. When a conductive grounding wire must clear a homokinetic joint, this may be done, for example, by passing the wire along the rubber bellows of the joint, whose folds preferably make a spiral suitable for this purpose.

It is clear that the scope of the invention is not limited to the examples described. Thus, it will be possible to provide electrical insulation for the mechanical transmission by any means, whether by insertion of an insulating section 80 as illustrated or by suitably insulating the splines generally present in the transmission shafts. The use of a pressure sensitive switch as a monitoring means and an electric bulb as an operating means has been described. But the invention is not concerned with these means; it instead relates to the transmission of an electric signal by electric conduction between mobile parts in rotation and stationary parts. It is possible to conceive transmitting any type of electric signal, even a coded signal, provided that it adapts to transient interruptions of electric contacts inherent in this principle of transmission by electric conduction.

Figure 4:
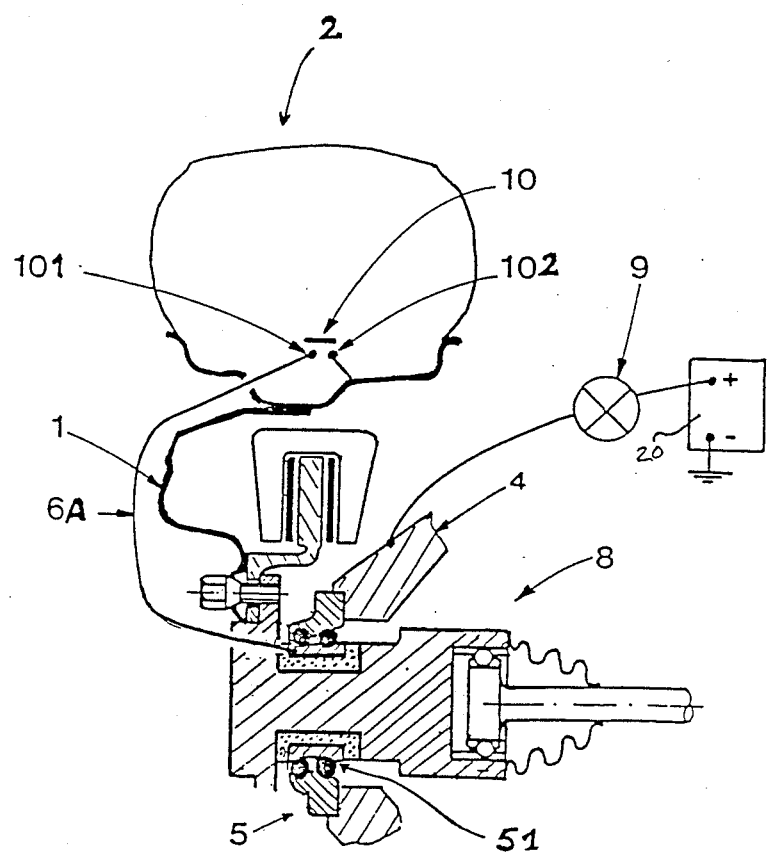
FIG. 4 shows another embodiment of the invention.

FIG. 4 illustrates another embodiment of the invention, applicable in the case where the insulation of the inside race 51 of bearing 5 is simpler to achieve than insertion of an insulation in the mechanical engine torque transmission 8. The inside race 51 is connected by electric wire 6A the monitoring means, symbolized by a pressure switch 10. Ground pole 102 of pressure switch 10 is connected to wheel 1, which therefore is part of the conductive path providing grounding via mechanical transmission 8. In practice, achievement of such a device involves only very few modifications. It suffices to eliminate the grounding of the suspension by a suitable connection to operating means 9 placed on the vehicle, to provide insulation for bearing 5, between its inside race 51 and mechanical transmission 8, and to provide an electric connection between said inside race 51 and the monitoring means installed on wheel 1.

Thus, the invention makes it possible, by selecting one or the other of the embodiments illustrated, to simplify to the maximum the achievement of the electric conduction between the stationary portion and a wheel, by judiciously using the electrical insulations existing on the vehicles, and by integrating into the necessary electric circuit an unsuspended element located in the stationary portion, namely, for example, wheel carrier 4, and most often a suspension element, depending on the facility available to achieve an electric connection.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. In a vehicle having at least one rotatable driving wheel, a stationary portion including suspension means for suspending said wheel, at least one bearing rotatably connecting said wheel and said suspension means, transmission means for transmitting rotational torque to said wheel, electrical means rotatable with said wheel and and having an electrical potential different from a vehicle ground electrical potential, means for electrically connecting said electrical means rotatable with said wheel to said operating means, comprising:
    one electrically conductive path connected between said operating means and said electrical means rotatable with said wheel, said one path comprising at least one unsuspended element of said suspension means and at least one of said bearings,
    insulating means for electrically insulating said at least one of said bearings from a portion of said transmission means at the vehicle ground electrical potential; and
    another electrically conductive path connected between said electrical means rotatable with said wheel and said grounded portion of said transmission means.

2. The vehicle of claim 1, wherein said insulating means comprises means for separating said transmission means into said grounded portion at the vehicle electrical potential and a part supporting said at least one bearing and forming a portion of said one conductive path.

3. The vehicle of claim 2, wherein said part of aid transmission means supporting said at least one bearing is an end part of said transmission means, and herein said one conductive path includes said wheel.

4. The vehicle of claim 3, wherein said another conductive path includes a conductive element connected between said electrical means rotatable with said wheel and said grounded portion of said transmission means.

5. The vehicle of claim 3, wherein said electrical means rotatable with said wheel comprise monitoring means for monitoring said wheel.

6. The vehicle of claim 4, wherein said conductive element comprises an insulated conductive wire passing through a portion of said end part of said transmission means.

7. The vehicle of claim 5, wherein said monitoring means comprises a tire pressure sensor positioned in a tire mounted on said wheel.

8. The vehicle of claim 5, wherein said monitoring means comprise a tire pressure sensor positioned in said end part of said transmission means, including means for communicating an air pressure in the tire to said monitoring means.

9. The vehicle of claim 5, including a brake for said at least one wheel, said brake having electrically conductive linings, further including a third electrically conductive path connected between said operating means and said monitoring means, said third path being electrically parallel with said one electically conducting path and including said brake.

10. The vehicle of claim 5, including insulating means for electrically insulating said at least one bearing from said transmission means, wherein said one path includes an electrically conductive wire connecting said electrical means to said at least one bearing and wherein said another path includes said wheel and said transmission means.

11. The vehicle of claim 10, wherein said monitoring means comprises a tire pressure sensor positioned in a tire mounted on said wheel.

12. The vehicle of claim 9, including a fourth electrically conductive path connected between said third path and the vehicle ground potential, said fourth path including brake inspection means for completing said fourth path only when said linings of said brake are worn beyond a predetermined level.

13. The vehicle of claim 12, including second operating means in said fourth path.

* * * * *